ered by insulation 26.

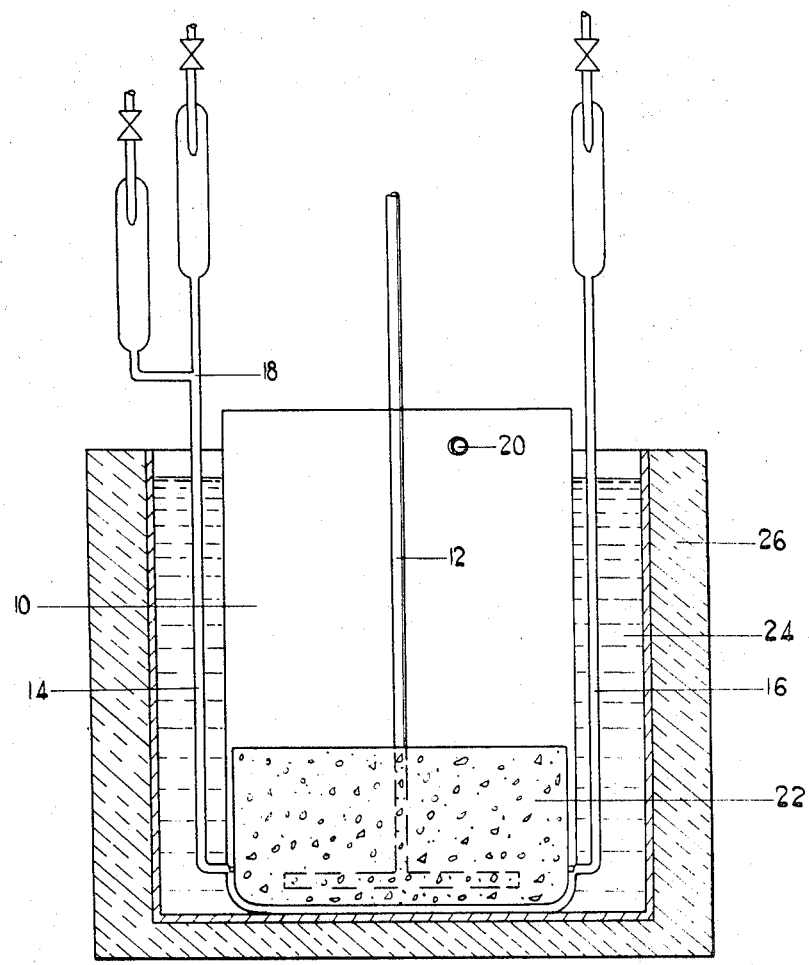

United States Patent Office 3,556,839
Patented Jan. 19, 1971

3,556,839
ELECTROLESS METAL COATING
Alexander R. Roy, Johannesburg, Transvaal, Republic of South Africa, assignor to Industrial Distributors (1946) Limited, Johannesburg, Transvaal, Republic of South Africa
Filed Oct. 24, 1967, Ser. No. 677,521
Claims priority, application Republic of South Africa, Nov. 1, 1966, 66/6,601, 66/6,602, 66/6,603
Int. Cl. C23c 3/02
U.S. Cl. 117—100
1 Claim

ABSTRACT OF THE DISCLOSURE

The invention concerns a process for coating objects, and in particular, natural or synthetic diamonds, with nickel or cobalt, by contacting the objects with a solution containing ions of the particular metal and a solution containing between 0.001 and 0.035 mole per litre of hypophosphite ions.

---

This invention relates to electroless metal coating.

The so-called electroless coating of objects is well known. The objects are coated by contact with a solution of a salt of the metal with which the object is desired to be coated, and a solution of a reducing agent capable of reducing, in solution, the metallic ions to the free metal. The best-known reducing agents for such processes are chosen from sodium hypophosphite, sodium borohydride, hydrazine and hydrogen at high pressures.

For the coating of nickel or cobalt on to objects, the preferred reducing agent is the hypophosphite ion. In all the prior art known to the applicant, the concentration of the hypophosphite ion has been stated to be between 0.15 and 1.2 moles per litre and mole ratio of metal ions to hypophosphite ions stated to be between 0.25 and 1.6.

The applicant has surprisingly found that it is possible to effect efficient metal-coating with hypophosphite concentrations which are substantially less than the prior art concentrations. In view of the cost of hypophosphites, this finding is very important.

It has also been surprisingly found that efficient metal-coating can be achieved with mole ratios of metal: hypophosphite substantially less than 0.25 or greater than 1.6.

In addition, the prior art has been somewhat restricted to the metal-coating of surfaces and of large objects and the applicant is not aware of any prior art relating to the electroless coating of comminuted or granular matter, and one of the objects of the invention is the coating of natural or synthetic diamonds with nickel or cobalt by the electroless process. Very good results are obtained by using the above-mentioned low hypophosphite ion concentration, preferably also using the lower and higher limits of the metal: hypophosphite ratio.

Still further, the majority of the prior art processes involving electroless coating are batch processes. Applicant is aware of a continuous process in which a solution of a nickel salt and a hypophosphite of predetermined concentration is prepared and circulated through a coating vessel, the solution being generated to the predetermined composition by addition of nickel and hypophosphite ions, and simultaneous removal of phosphite ions.

One of the objects of the present invention is to provide a novel and improved continuous process for electroless coating, in which the low hypophosphite ion concentration mentioned above and the upper or lower mole ratio of metal to hypophosphite may be employed. In fact, the choice of this lower hypophosphite ion concentration and the upper or lower mole ratios is the main factor responsible for the improved continuous process.

The novel continuous process avoids the necessity of regenerating the coating solution; it also ensures that a substantially constant composition of the coating solution is maintained; and, of course, the concentrations of the metal and hypophosphite ions are much lower than those of the prior art.

According to the invention a process for coating an object with nickel or cobalt includes the step of contacting the object or objects with a solution containing nickel or cobalt ions and a solution of a hypophosphite, the latter solution containing between 0.001 and 0.035 mole per litre of hypophosphite ions.

The mole ratio between metal and hypophosphite ions may be within the range of 0.04 to about 7 and the preferred limits of the ratios are either between 0.04 and 0.25 or between 1.6 and 6. However, these ratios may be higher or lower depending on whether it is convenient or practical to recover the metal or hypophosphite values of the effluent.

Although many types of objects may be coated according to the present invention, the process finds particular application to the coating of diamonds with nickel or cobalt.

Further according to the invention there is provided a continuous process for coating objects with nickel or cobalt including the steps of locating the objects in a vessel and feeding into the vessel a solution containing nickel or cobalt ions and a solution containing hypophosphite ions at concentrations and rates corresponding to a predetermined analysis of the overflow effluent.

Thus, a predetermined composition of the solution in the vessel can be maintained by increasing or decreasing the rate of feed of either the metal ion solution or the hypophosphite solution, depending on the composition of the effluent passing out of the vessel. It will be appreciated, of course, that the pH is also maintained at a predetermined value in the same way.

The concentration of the hypophosphite in the vessel is preferably maintained between 0.001 and 0.035 mole per litre, which means that the rate of addition of a hypophosphite solution of predetermined concentration to the vessel is controlled so that the analysis of the overflow effluent is between 0.001 and 0.035 mole per litre of hypophosphite ions. In addition, the mole ratio between metal and hypophosphite ions is preferably maintained at between 0.04 to 0.25 or between 1.6 and 6. The latter range is preferred because it ensures that an excess of nickel ions is maintained in the coating vessel. The effluent contains a very small amount of hypophosphite ions together with substantial amounts of nickel ions and phosphite ions. Once the nickel values have been recovered from the effluent, the effluent can be discarded since it will contain only negligible amounts of expensive hypophosphite.

Apparatus according to the invention includes a vessel provided with a stirrer and one or more inlets for the metal solution and for the hypophosphite solution, means for controlling the flow through each inlet, and an overflow. A further inlet for an alkaline solution to correct the pH of the solution when necessary is also provided, but this can be let into the hypophosphite inlet.

A preferred embodiment of the invention is described below with reference to the accompanying diagram.

In the diagram a vessel 10 is provided with a stirrer 12 and with two inlets 14 and 16 at low levels, for the hypophosphite solution and the nickel or cobalt solution. A solution of an alkali for adjusting the pH of the mixture when necessary is let into the hypophosphite inlet as shown at 18. An overflow outlet 20 is also provided. A mass of diamonds 22 is located in the vessel, and the vessel is located in an electrically-heated waterbath 24 surrounded by insulation 26.

The solution in the vessel may be maintained with stirring at a concentration of approximately 0.5 gm./l. of nickel chloride (in the form of $NiCl_2 \cdot 6H_2O$) (0.0021 mole/litre) and 2.0 gm./l. of sodium hypophosphite (0.0227 mole/litre) giving a ratio of $Ni:H_2PO_2$ of 0.093. In another example the ratio is 1.86 (2.5 gm./l. of nickel chloride and 0.5 gm./l. of sodium hypophosphite).

The following examples illustrate the invention:

EXAMPLE 1

The following two solutions are prepared:

(a) A nickel solution ($NiCl_2.6H_2O$, 40 gm./l.; $NH_4Cl$ 80 gm./l. + $NH_4OH$ to a pH of between 8.5 and 9.)

The citrate concentration may be varied within wide limits, and it may be zero. The rate of reaction decreases with increasing citrate concentration.

(b) A sodium hypophosphite solution containing 50 gm./l.

An alkali solution to control the pH of the solution in the bath is also provided.

The coating vessel is first filled with water, then diamond is added, after having been sensitised with a warm approximately 7 percent $SnCl_2$ solution, rinsed and treated with a warm approximately 0.1 percent solution of palladium chloride solution and rinsed. The nickel solution and the hypophosphite solution are then fed into the vessel at the same time, the rates of addition of the two solutions being adjusted to give approximately 0.5 gm./l. of $NiCl_2 \cdot 6H_2O$ and approximately 2 gm./l. of $NaH_2PO_2$ in the overflow effluent.

The pH can be maintained between 4 and 11, but it is preferred to operate at between 6 and 9.

The temperature should be between 70° C. and 88° C., but the best results are obtained at temperatures between 84° and 86° C.

The diamonds are uniformly and well-coated and the product can contain any desired percentage of metal and is well-suited for use in the manufacture of abrasive articles.

EXAMPLE 2

Example 1 is repeated but the rates of addition of the two solutions is adjusted to give approximately 0.25 gm./l. of $NiCl_2 \cdot 6H_2O$ and 2.5 gm./l. of hypophosphite in the overflow effluent. This corresponds to a mole ratio of approximately 0.04.

EXAMPLE 3

Example 1 is repeated but the rates of addition of the two solutions is adjusted to give approximately 1.75 gm./l. of $NiCl_2 \cdot 6H_2O$ and 0.1 gm./l. of hypophosphite in the overflow effluent. This corresponds to a mole ratio of 6.48.

It will be appreciated that the concentrations of the nickel and hypophosphite solutions, in Examples 2 and 3 can be varied so as more easily to obtain the desired concentrations of the overflow effluent.

EXAMPLE 4

Two steel sheets, one of 18 sq. cms. in area and the other of 47 sq. cms. and one brass sheet of 32 sq. cms. in area were suspended in the bath after suitable cleaning and pre-treatment with palladium chloride solution (0.1%). Using the concentrations of Example 1 it was found that the three plates were coated with nickel at a rate of 25 microns per hour.

EXAMPLES 5 TO 7

Examples 1 and 3 are repeated using $Co Cl_2 \cdot 6H_2O$ instead of $NiCl_2 \cdot 6H_2O$ in the same concentrations.

Again, the diamonds are uniformly and well coated.

I claim:

1. A continuous process for coating diamonds having a surface sensitive to receive a coating of a metal selected from the group consisting of nickel and cobalt, comprising locating the objects in a vessel, continuously feeding into the vessel a solution containing ions of such metal and a solution containing hypophosphite ions at concentrations and rates corresponding to an analysis of the overflow effluent of between 0.001 and 0.035 mole per liter of hypophosphite ions and a metal:hypophosphite mole ratio chosen from the limits of from 0.04 to 0.25 and 1.6 to 7, and continuously removing overflow effluent from the vessel.

References Cited

UNITED STATES PATENTS

| | | | |
|---|---|---|---|
| 2,532,283 | 12/1950 | Brenner et al. | 117—130X |
| 2,872,312 | 2/1959 | Eisenberg | 117—100X |
| 3,049,435 | 8/1962 | Shwayder | 117—27X |
| 3,116,159 | 12/1963 | Fisher et al. | 117—130X |
| 3,254,970 | 6/1966 | Dittrich et al. | 29—183.5 |

FOREIGN PATENTS

| | | | |
|---|---|---|---|
| 1,427,581 | 12/1965 | France | 117—93.1 |

RALPH S. KENDALL, Primary Examiner

U.S. Cl. X.R.

106—1; 117—47, 160; 118—429